United States Patent [19]
Liao et al.

[11] Patent Number: 5,771,168
[45] Date of Patent: Jun. 23, 1998

[54] POWER FACTOR CORRECTION APPARATUS

[75] Inventors: Pei-Sheng Liao; Bahman Sharifipour, both of Taipei, Taiwan

[73] Assignee: Delta Electronics, Inc., Taipei, Taiwan

[21] Appl. No.: 796,930

[22] Filed: Feb. 7, 1997

[51] Int. Cl.$^6$ ..................................................... H02M 7/04
[52] U.S. Cl. ............................. 363/143; 323/222; 363/89
[58] Field of Search .............................. 323/222; 363/89, 363/143; 315/307

[56] References Cited

U.S. PATENT DOCUMENTS

| | | | |
|---|---|---|---|
| 4,656,571 | 4/1987 | Umezu | 363/143 |
| 4,691,275 | 9/1987 | Moscovici | 363/143 |
| 5,097,402 | 3/1992 | Kriz et al. | 363/143 |
| 5,258,901 | 11/1993 | Fraidlin | 363/89 |
| 5,383,109 | 1/1995 | Maksimovic et al. | 323/222 |
| 5,532,917 | 7/1996 | Hung | 363/67 |

*Primary Examiner*—Stuart N. Hecker

*Attorney, Agent, or Firm*—Fay, Sharpe, Beall, Fagan, Minnich & McKee

[57] ABSTRACT

The present invention relates to a power factor correction apparatus, which comprises: a rectifier device being inputted with one of a first amplitude AC voltage signal and a second amplitude AC voltage signal, wherein said first amplitude is higher than said second amplitude; a switch device for performing an on/off switching; a magnetic energy storing element electrically connected to said rectifier device and said switch device for converting an electric energy delivered by an electric level signal into a magnetic energy for storing when said switch device is switched on; and an electric charge storing element electrically connected to said magnetic energy storing element for receiving said magnetic energy stored in said magnetic energy storing element and storing as an electric energy when said switch device is switched off, which comprises two capacitors with a voltage endurance higher than said second amplitude and lower than/equal to said first amplitude, said two capacitors are series connected when said first amplitude AC voltage signal is inputted, and are parallel connected when said second amplitude AC voltage signal is inputted.

6 Claims, 4 Drawing Sheets

POWER FACTOR CORRECTION APPARATUS

FIELD OF THE INVENTION

The present invention relates to a power factor correction apparatus, and more particularly to a power factor correction apparatus for a power supply.

BACKGROUND OF THE INVENTION

In solving the problem of harmonic current in a power supply, the power factor correction (PFC) is one of the most popular methods used today. A schematic block diagram of a conventional power supply having power factor correction apparatus is shown in FIG. 1. The inputted AC power is filtered and rectified by an EMI (Electromagnetic Interference) filter 11 and a bridge-type rectifier device 12 respectively, and inputted to a single-stage power factor correction apparatus 13 for power correction, then converted by a DC voltage convertor 14 for outputting. A pulse width modulation control circuit 15 is employed for feedback control.

The circuit diagram of a conventional active single-stage power factor correction apparatus for a power supply is shown in Fig. 2, wherein $L_B$ is a step-up inductor. When the switch SW made of MOSFET is switched on, the electric current will flow through inductor $L_B$, diode $D_1$, transformer coil $N_1$, and switch SW for providing energy to the secondary coil $N_s$ of a DC voltage transformer and storing energy in inductor $L_B$. When the switch SW is switched off, the energy stored in $L_B$ will be delivered to capacitor $C_B$ by means of diode $D_2$. Since there is no feedback control in the single-stage power factor correction apparatus, the voltage $V_B$ on capacitor $C_B$ is varied as the variation of the inputted AC power. Therefore, if the AC power is a wide-range AC input (e.g. between 110 $V_{ac}$ to 220 $V_{ac}$), then $V_B$ will varied enormously from 120 $V_{dc}$ to 400 $V_{dc}$ depending on the design thereof. In order to endure such a high voltage and have a sufficient capacitance for maintaining a sufficient voltage hold-up time to decrease the unstability of the output voltage, a capacitor with higher capacitance and higher voltage endurance is required. However, this type of capacitor is very expensive and bulky, which causes that the circuit and heat dissipation are very difficult to design.

SUMMARY OF THE INVENTION

The major object of the present invention is to improve the above mentioned drawbacks of the conventional art.

The present invention relates to a power factor correction apparatus, which comprises: a rectifier device being inputted with one of a first amplitude AC voltage signal and a second amplitude AC voltage signal, wherein said first amplitude is higher than said second amplitude; a switch device for performing an on/off switching operation; a magnetic energy storing element electrically connected to said rectifier device and said switch device for converting an electric energy delivered by an electric level signal into a magnetic energy for storing when said switch device is switched on; and an electric charge storing element electrically connected to said magnetic energy storing element for receiving said magnetic energy stored in said magnetic energy storing element and storing as an electric energy when said switch device is switched off, and having two capacitors with a voltage endurance higher than said second amplitude and lower than/equal to said first amplitude, said two capacitors being connected in series when said first amplituide AC voltage signal is inputted, and connected in parallel when said second amplitude AC voltage signal is inputted.

According to the above idea, wherein said rectifier device is a bridge-type rectifier device.

According to the above idea, wherein said switch device is a MOSFET.

According to the above idea, wherein said magnetic energy storing element is an inductor.

According to the above idea, wherein said electric charge storing element further comprises a voltage selector electrically connected to said rectifier device for switching into said series connection when said first amplitude AC voltage signal is inputted and switching into said parallel connection when said second amplitude AC voltage signal is inputted.

According to the above idea, wherein said first amplitude AC voltage signal and said second amplitude AC voltage signal are 220 V and 110 V respectively, and said voltage endurance of said capacitors is 200 V.

BRIEF DESCRIPTIONS OF THE DRAWINGS

The present invention can be better understood by the following drawings and the detailed descriptions, in which.

Figure 1:
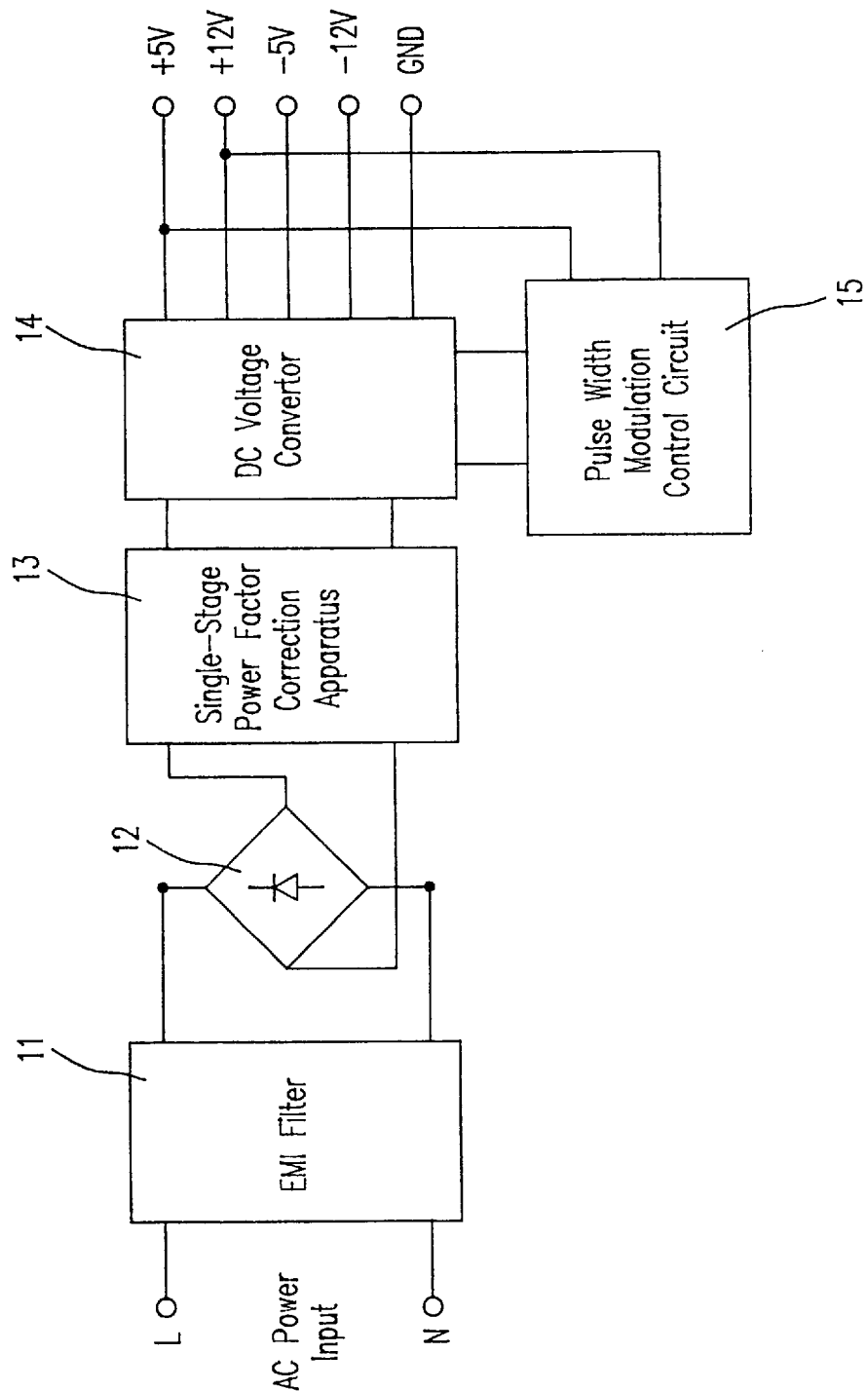
FIG. 1 is a schematic block diagram of a conventional power supply having a single-stage power factor correction apparatus.
Figure 2:
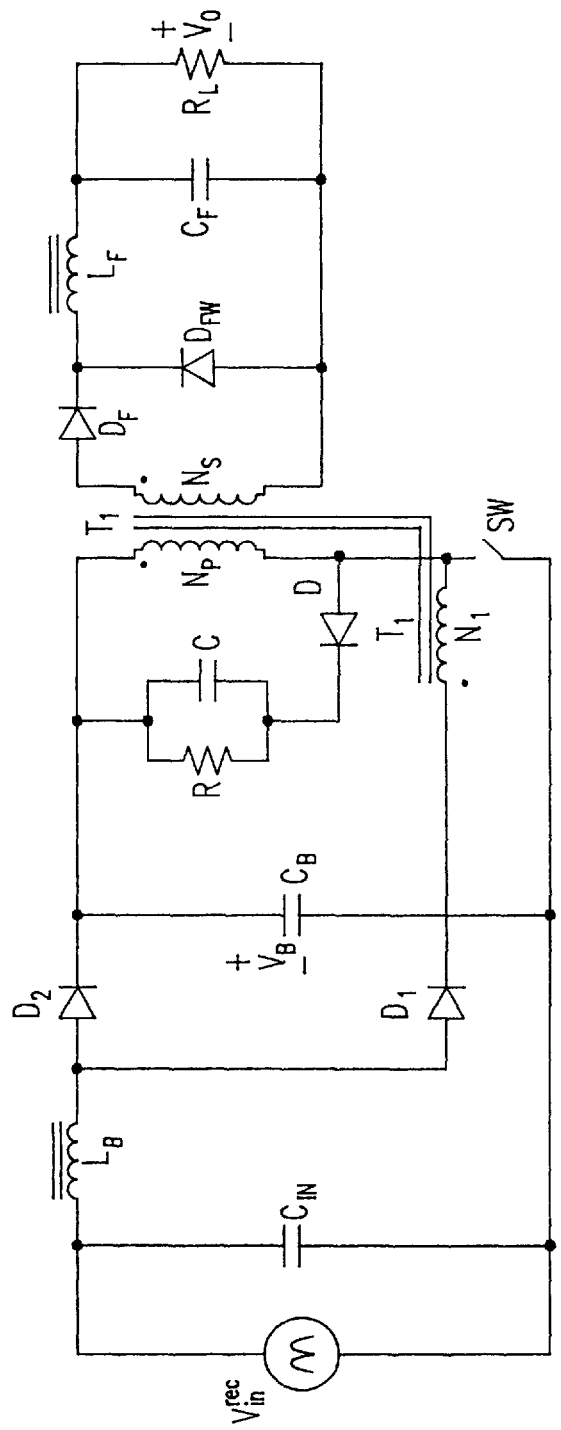
FIG. 2 is a circuit diagram of a conventional active single-stage power factor correction apparatus for a power supply.
Figure 3A:
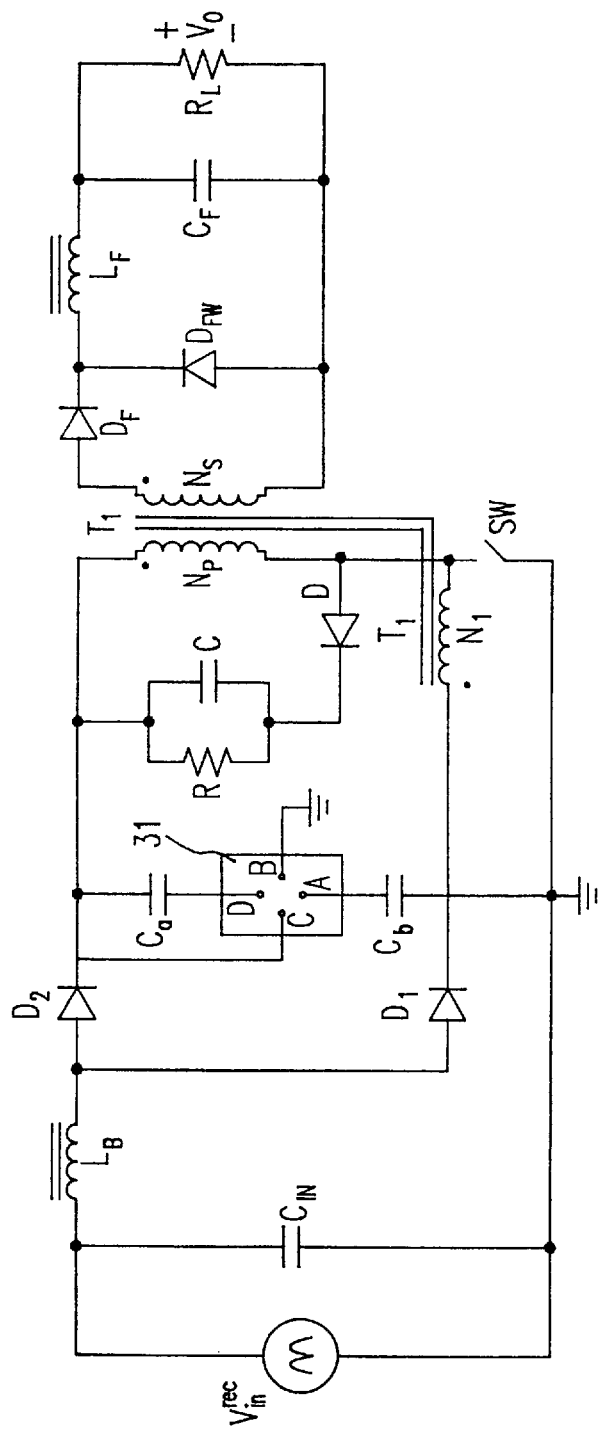
Figure 3B:
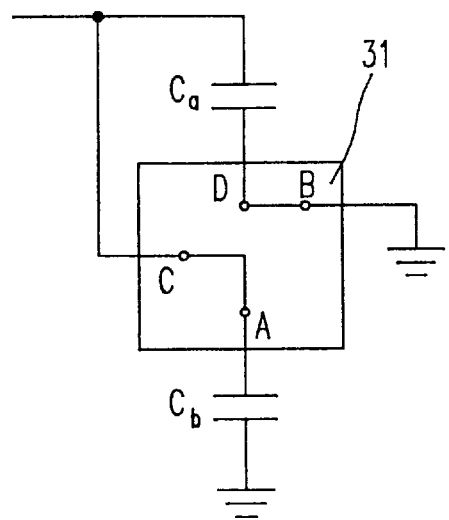
Figure 3C:
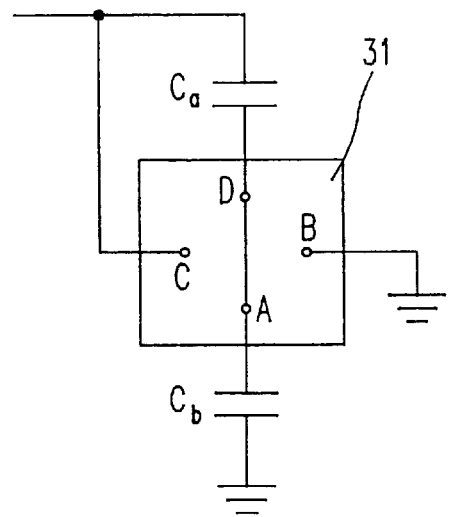

FIG. 3(a)–3(c) are schematic circuit diagrams of a preferred embodiment of the present invention;

DETAILED DESCRIPTIONS OF THE PREFERRED EMBODIMENT

Please refer to FIG. 3(a), since a conventional capacitor with high voltage endurance and high capacitance is very expensive and bulky, the present invention will use two capacitors $C_a$ and $C_b$ with lower voltage endurance and lower volume, and use a voltage selector 31 for switching between said two capacitors to achieve the required function and reduce the volume and the cost. For example, a conventional power supply having 200 W output will use two capacitors connected in parallel, each capacitor has a capacitance of 470 µF, a voltage endurance of 400 V, a volume of 35×50 mm (cylinder diameter×height), while the preferred embodiment of the present invention will use two smaller capacitors having capacitance of 470 µF, voltage endurance of 200 V, and volume of only 22×50mm (cylinder diameter× height) so as to reduce the volume and the cost.

Please refer to FIG. 3 (b) and 3(c), when the inputted AC power is 110 V, the voltage selector 31 will switch as shown in FIG. 3(b) to form a parallel connection of said two capacitors having an equivalent capacitance of $C_a+C_b$, therefore an equivalent capacitance of 940 µF with voltage endurance of 200 V is sufficient to cope with the 110 V AC power. When the inputted AC power is 220 V, the voltage selector 31 will switch as shown in FIG. 3(c) to form a series connection of said two capacitors having an equivalent capacitance of $C_aC_b/(C_a+C_b)$, therefore an equivalent capacitance of 235 µF with voltage endurance of 400 V is sufficient to cope with the 220 V AC power.

Summing up the above, by means of the present invention, the cost and the volume of the conventional art are reduced, and the heat dissipation is improved, while the voltage endurance and the voltage hold-up time are still maintained within the required specification.

The above embodiment can be modified by any skillful person in the art without departing the spirit and scope of the accompanying claims.

We claim:

1. A power factor correction apparatus, comprising:

a rectifier device being inputted with one of a first amplitude AC voltage signal and a second amplitude AC voltage signal, wherein said first amplitude is higher than said second amplitude;

a switch device for performing an on/off switching operation;

a magnetic energy storing element electrically connected to said rectifier device and said switch device for converting an electric energy delivered by an electric level signal into a magnetic energy for storing when said switch device is switched on; and an electric charge storing element electrically connected to said magnetic energy storing element for receiving said magnetic energy stored in said magnetic energy storing element and storing as an electric energy when said switch device is switched off, and having two capacitors with a voltage endurance higher than said second amplitude and lower than/equal to said first amplitude, said two capacitors being connected in series when said first amplitude AC voltage signal is inputted, and connected in parallel when said second amplitude AC voltage signal is inputted.

2. The power factor correction apparatus according to claim 1, wherein said rectifier device is a bridge-type rectifier device.

3. The power factor correction apparatus according to claim 1, wherein said switch device is a MOSFET.

4. The power factor correction apparatus according to claim 1, wherein said magnetic energy storing element is an inductor.

5. The power factor correction apparatus according to claim 1, wherein said electric charge storing element further comprises a voltage selector electrically connected to said rectifier device for switching into said series connection when said first amplitude AC voltage signal is inputted and switching into said parallel connection when said second amplitude AC voltage signal is inputted.

6. The power factor correction apparatus according to claim 1, wherein said first amplitude AC voltage signal and said second amplitude AC voltage signal are 220 V and 110 V respectively, and said voltage endurance of said capacitors is 200 V.

* * * * *